United States Patent

Newell, Jr. et al.

(10) Patent No.: US 6,772,232 B1
(45) Date of Patent: Aug. 3, 2004

(54) ADDRESS ASSIGNMENT PROCEDURE THAT ENABLES A DEVICE TO CALCULATE ADDRESSES OF NEIGHBOR DEVICES

(75) Inventors: Lawrence Bert Newell, Jr., Jalisco (MX); Ricardo Osuna Leyva, Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/384,655

(22) Filed: Aug. 26, 1999

(51) Int. Cl.[7] .............................................. G06F 13/00
(52) U.S. Cl. ............................ 710/9; 710/3; 709/245
(58) Field of Search .......................... 709/245; 710/3, 710/4, 8, 9

(56) References Cited

U.S. PATENT DOCUMENTS

| | | | | |
|---|---|---|---|---|
| 4,317,629 A | | 3/1982 | Kuseski ........................ 355/24 |
| 4,443,866 A | * | 4/1984 | Burgiss, Sr. ................. 710/100 |
| 5,018,081 A | | 5/1991 | Yamaguchi et al. | |
| 5,107,299 A | | 4/1992 | Farrell et al. ................ 355/207 |
| 5,148,284 A | | 9/1992 | Nishikawa et al. .......... 358/296 |
| 5,210,823 A | | 5/1993 | Moroi | |
| 5,413,419 A | | 5/1995 | Oami et al. .................... 400/61 |
| 5,465,330 A | * | 11/1995 | Komatsu et al. ............. 709/222 |
| 5,613,158 A | * | 3/1997 | Savage ........................... 710/9 |
| 5,623,610 A | * | 4/1997 | Knoll et al. ................. 710/300 |
| 5,664,074 A | | 9/1997 | Kageyama et al. | |
| 5,680,522 A | | 10/1997 | Kasai | |
| 5,745,682 A | * | 4/1998 | Keenan ........................ 709/220 |
| 5,748,483 A | | 5/1998 | Richardson et al. | |
| 5,805,924 A | * | 9/1998 | Stoevhase ...................... 710/11 |
| 5,828,899 A | * | 10/1998 | Richard et al. ................. 710/8 |
| 5,941,956 A | * | 8/1999 | Shirakihara et al. ........ 709/245 |
| 5,991,830 A | * | 11/1999 | Beard et al. ................... 710/18 |
| 6,014,715 A | * | 1/2000 | Stoevhase ...................... 710/11 |
| 6,131,119 A | * | 10/2000 | Fukui .......................... 709/224 |
| RE37,613 E | * | 3/2002 | Savage ........................... 710/9 |
| 6,377,987 B1 | * | 4/2002 | Kracht ......................... 709/220 |
| 6,378,000 B1 | * | 4/2002 | Akatsu et al. ............... 709/245 |
| 6,385,668 B1 | * | 5/2002 | Gaddess et al. ................ 710/8 |
| 6,457,061 B1 | * | 9/2002 | Bal et al. ..................... 709/245 |
| 6,529,951 B1 | * | 3/2003 | Okuyama et al. ........... 709/223 |
| 6,542,510 B1 | * | 4/2003 | Fujimori et al. ............. 370/402 |
| 6,567,405 B1 | * | 5/2003 | Borella et al. ............... 370/389 |

* cited by examiner

Primary Examiner—Kenneth R. Coulter

(57) ABSTRACT

The method of the invention enables assignment of addresses to devices in a system, wherein each assigned address allows each device to determine addresses of neighboring devices. The procedure used to assign the addresses employs a multi-order address field, with a number assigned to a respective reference device used as the value that is inserted into a high order position of the address field. In the next lower order position of the address field is inserted the number of the device that is immediately connected to the respective connector. Thereafter, the lower orders of the address field are completed in accord with the physical position of each device in relation to the higher order devices that are coupled to the respective connector. Devices thereafter can determine addresses of adjoining devices by either removing an order from their address or adding an order thereto with a predetermined value inserted.

12 Claims, 4 Drawing Sheets

| ADDRESSES OF DEVICES CONNECTED TO REFERENCED DEVICE | | | |
|---|---|---|---|
| ADDRESS OF REFERENCE DEVICE | | | |
| ADDRESS OF DEVICE ABOVE REFERENCE | | | |
| 1 | 1 | 1 | 1 |
| 1 | 1 | 1 | 2 |

FIG.2

ADDRESS ASSIGNMENT PROCEDURE THAT ENABLES A DEVICE TO CALCULATE ADDRESSES OF NEIGHBOR DEVICES

FIELD OF THE INVENTION

This invention relates to address assignment procedures in a data processing system and, more particularly, to a procedure for assigning addresses to devices in a system that enables a given device to determine addresses of neighboring devices through a calculation based on the given device's address.

BACKGROUND OF THE ART

In the prior art, there are many procedures used to enable the assignment of addresses to devices in a computing system. Ordinarily, for one device to determine the address of a neighboring device (or any other device in the computing system), the device will refer to a table of addresses that is either stored locally or is stored as part of a central data repository. Such an address table storage facility (or facilities) requires allocations of memory which is almost invariably a scarce commodity. This is especially true in printing devices.

In such printing devices, input devices to the printing device provide paper to the printer engine. Such input devices consist of plural trays of paper, each with a different size of paper. Each printing device has one or more paper paths that are used to move paper. There are also output devices associated with the printing device that accept paper from the printing device and deliver it to its final destination.

When using paper-handling devices with a printing device, there is a need to address such devices in a manner that their physical location is immediately known from the address value. An ability to determine the addresses of neighboring devices is important when moving paper to and from the printing device, as each such device needs to communicate with the one or more devices that are physically next in line of paper movement.

Currently the position of a device in a printing system is assumed, based on the use of shift register hardware. In other words, in current printing systems, the order in which the bytes are arrayed in a shift register controls the routing of the data. Each device does not know how to determine its neighbor's address as the use of the shift register queuing solution enables data to be routed to devices of the system, based on the order it is put into the shift registers of the device, and the paper handling controller. In such a system, devices cannot send messages to their neighbors because they do not know who their neighbors are. Accordingly, system flexibility is substantially constrained.

Accordingly, it is an object of this invention to provide a method for assigning addresses to devices in a system that conserves memory resources.

It is another object of the invention to provide an improved method of address assignment that enables devices populating a system to calculate addresses of neighboring devices without having to store such addresses.

It is a further object of the invention to provide an improved method of address assignment that enables devices populating a system to determine relative physical positions of adjoining devices by the addresses of such devices.

SUMMARY OF THE INVENTION

The method of the invention enables assignment of addresses to devices in a system, wherein each assigned address allows each device to determine addresses of neighboring devices. At least one given device of the system is coupled via a first connector to a reference device. Each device of the system further has one or more ports for communication with other devices. The method initially powers the first connector and assigns a first address value to the given device. Next, the number of communication ports included with the given device are found that are coupled to additional devices. The given device is then caused to power one of its communication ports. Thereafter, a second address value is assigned to a device connected to one of the communication ports, the second address value having a predetermined relationship with the first address value. Next, the given device is controlled to power each additional one of its communication ports and devices connected to those ports are assigned additional unique address values, the additional address values having predetermined relationships with the first address value. The predetermined relationships enable each device of the system, knowing its own assigned address and the predetermined relationship between address values, to determine addresses of at least neighboring devices in the system.

BRIEF DESCRIPTION OF THE DRAWINGS

FIG. 2 is a chart that is useful in understanding the ordering of addresses that are assigned by the method of the invention.

DETAILED DESCRIPTION OF THE PREFERRED EMBODIMENT

Figure 1:
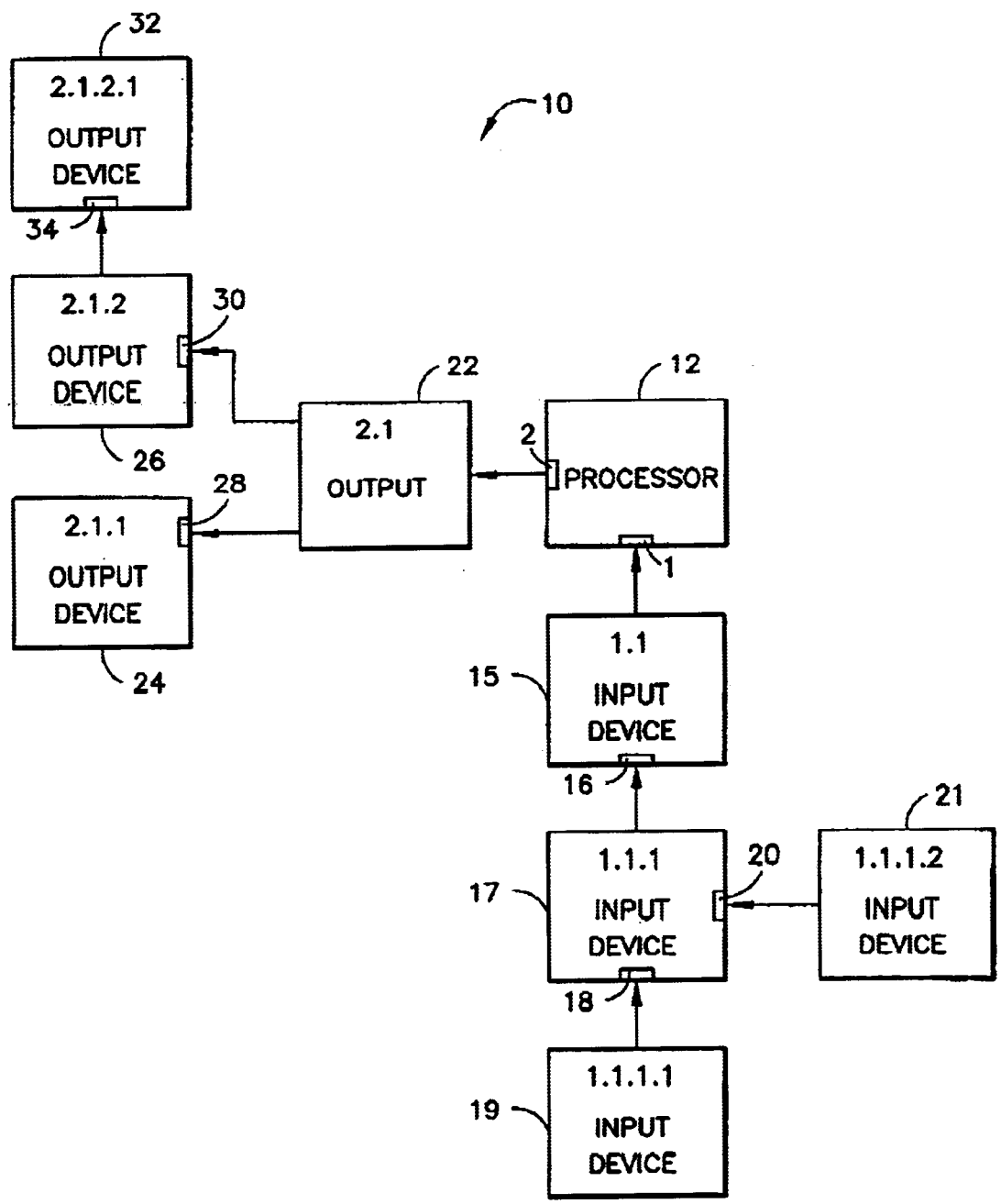
FIG. 1 is a high level block diagram of a printing system that incorporates the invention.

Referring to FIG. 1, a printing system 10 includes a control processor 12 that is utilized in assigning addresses to coupled devices within system 10. Each coupled device is illustrated by a box in FIG. 1 as either being coupled by a connector or by a logical port. Thus input device 15 is coupled to control processor 10 via a connector 1. Input device 17 is coupled to input device 15 via port 16, while input devices 19 and 21 are coupled to input device 17 via ports 18 and 20, respectively.

On the output side of printing system 10 is an output device 22 that is connected to connector 2.

As is apparent in FIG. 1, input devices 15, 17, 19, and 21 as well as output devices 22, 24, 26, and 28 can be grouped onto levels. Input device 15 and output device 22 connect directly to and are each at a first level with relation to processor 12, input device 17 and output devices 24 and 26 are each at a second level since they each connect to processor 12 through another device. Input devices 19 and 21 and output device 32 are each at yet a third level since communications with processor 12 for each of these devices passes through two other devices. As will be described below, the addresses assigned to a device or devices of a given level will each be of the same order. Output device 22 is further coupled to output devices 24 and 26, via ports 28 and 30, respectively. An additional output device 32 is coupled to output device 24 via port 34.

Figure 3A:
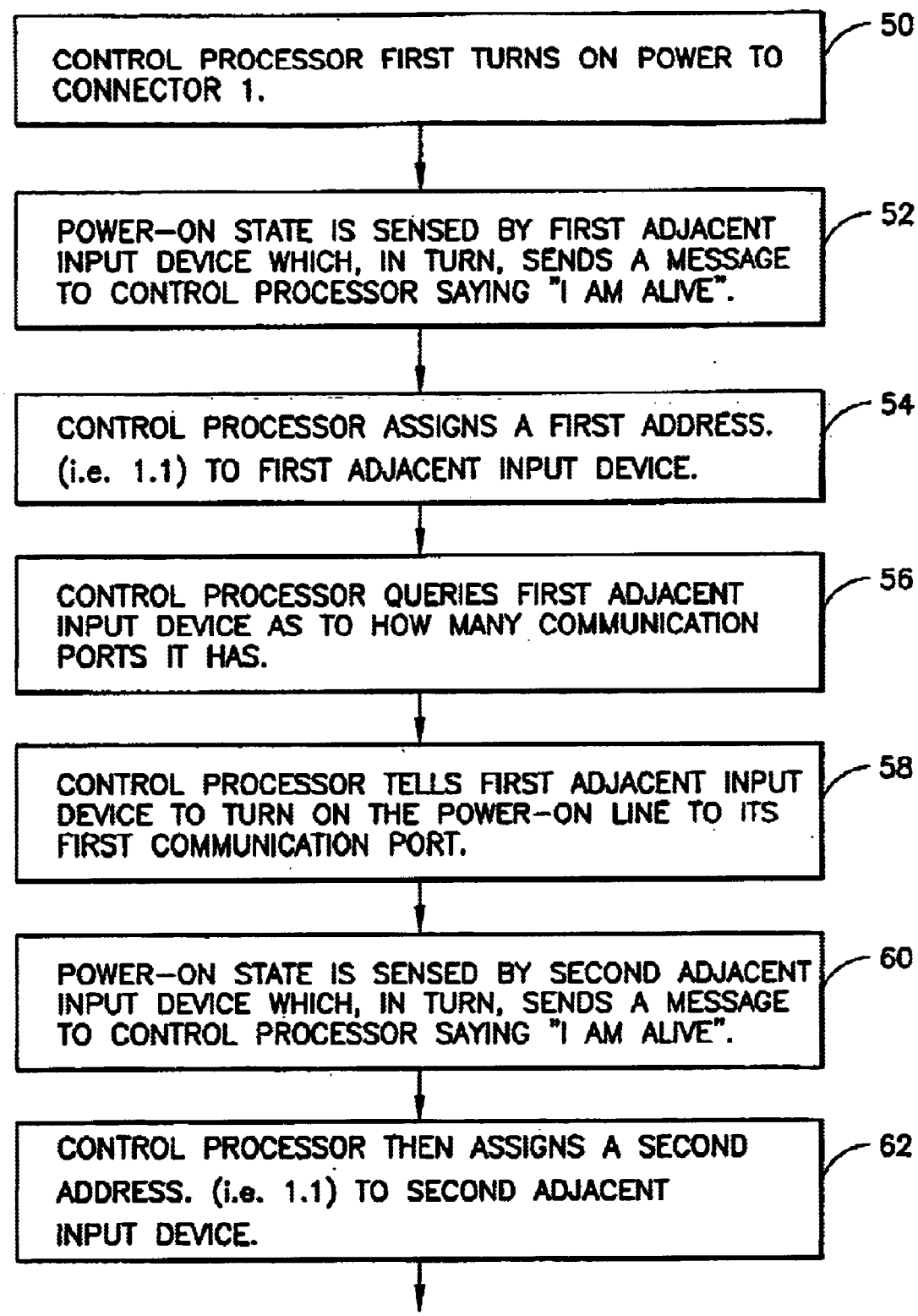
FIGS. 3a and 3b comprise a logic flow diagram which is useful in understanding the method of the invention.
Figure 3B:
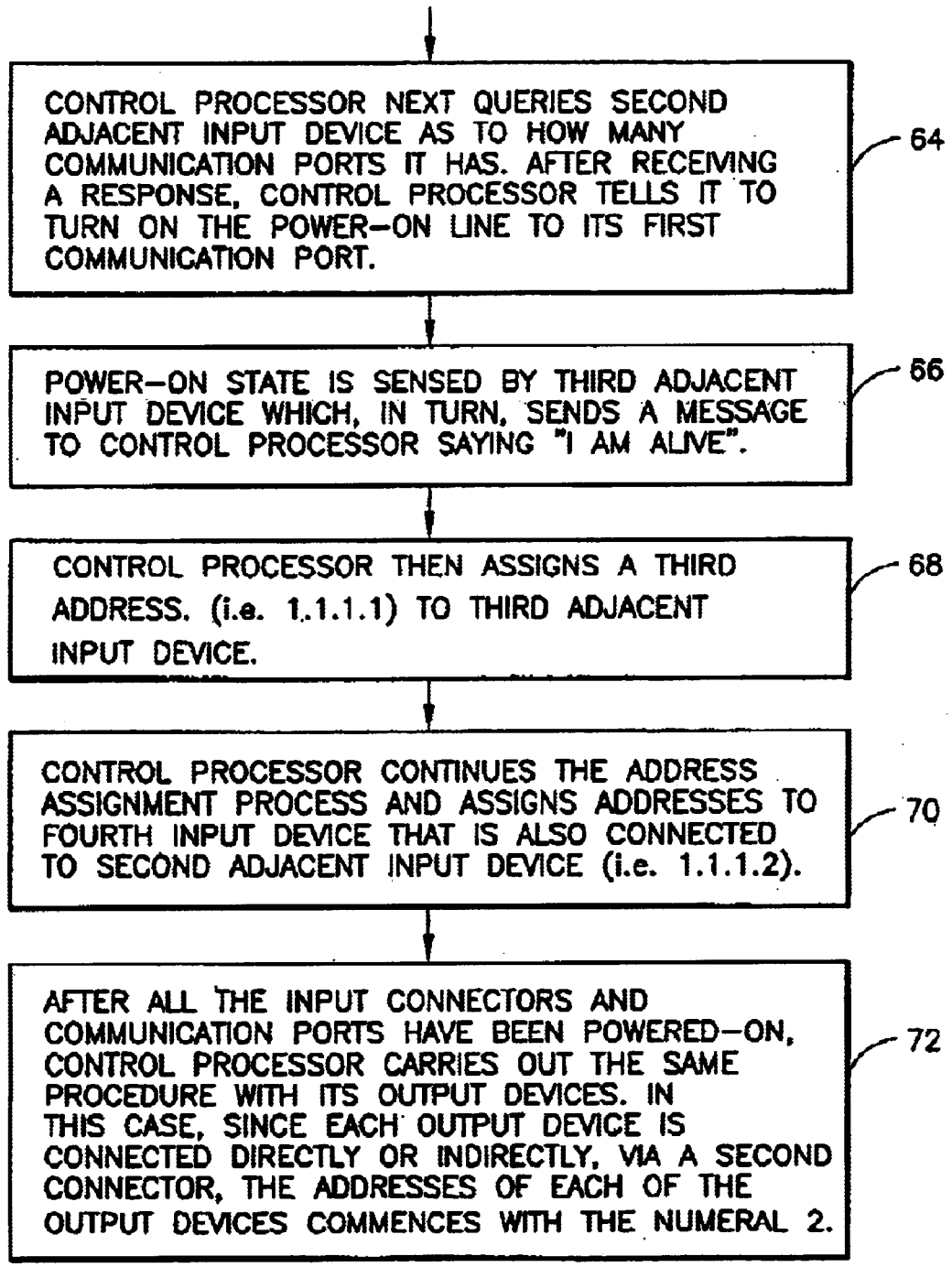

Turning now to a description of the method of address assignment employed by the invention and with reference to FIGS. 3a and 3b, printing system 10 incorporates an ability, through control exercised by control processor 12, to power on one connector at a time. Accordingly, control processor 12 first turns on power to connector 1 (step 50). Such power-on state is sensed by input device 15 which, in turn, sends a message to control processor 12 saying "I am alive" (step 52). Control processor 12 then assigns a first address. (i.e. 1.1) to input device 15 (step 54).

Next, control processor queries input device 15 as to how many communication ports it has (step 56). After receiving a response from input device 15, control processor 12 dispatches a message to input device 15, telling it to turn on the power-on line to the first communication port (i.e., port 16) (step 58). Such power-on state is sensed by input device 17 which, in turn, sends a message to control processor 12 saying "I am alive" (step 60). Control processor 12 then assigns a second address. (i.e. 1.1.1) to input device 17 (step 62).

Since input device 15 has only one communication port (i.e., port 16), control processor 12 next queries input device 17 how many communication ports it has. After receiving a response from input device 17, control processor 12 dispatches a message to input device 17, telling it to turn on the power-on line to its first communication port (i.e., port 18) (step 64). Such power-on state is sensed by input device 19 which, in turn, sends a message to control processor 12 saying "I am alive" (step 66). Control processor 12 then assigns a third address. (i.e. 1.1.1.1) to input device 19 (step 68). The process continues, with input device 21 being assigned address 1.1.1.2, as it is coupled to the second communication port 20 of input device 17 (step 70).

After all the input connectors and communication ports have been powered-on, control processor 12 commences the same procedure with its output devices. But in this case, since each of the output devices is connected via connector 2, the addresses of each of the output devices commences with the numeral 2 (step 72).

In the example shown in FIG. 1, control processor 12 causes the power on of the devices in the following sequence:

Input device 15
Input device 17
Input device 19
Input device 21
Output device 22
Output device 24
Output device 26
Output device 32

The procedure used to assign the addresses employs a multi-order address field. A number assigned to a respective connector at control processor 12 is used as the value that is inserted into the high order position of the address field of a device connected to the respective connector. In the next lower order position of the address field, a "1" value is inserted to complete the address of the device that is immediately connected to the respective connector. Thereafter, the lower orders of the address field are completed in accord with the physical position of each device in relation to the higher order devices that are coupled to the respective connector. Note, that while this description indicates a progression from high order to low order of the address field, the reverse arrangement can also be used. Further, while the values "1" and "2" are hereafter used in the explanation of the invention, the inserted values must merely have a predetermined relationship with each other that is known to each particular device, to enable operation of the invention.

With the addressing procedure of the invention, the devices automatically know the addresses of the devices that are physically next to them and each device has the ability for peer-to-peer communication with adjoining devices. For example, input device 17 has the assigned address 1.1.1. Input device 17 thus knows that it has three neighbors and that it can determine its neighbors using the address assigned to itself. For device 17 to find the address of the device above it (i.e., closer to control processor 12), it need only remove the last field of its own address to arrive at the desired address (i.e. 1.1). If it wants to find the address of the device connected to its first port (i.e., p 18), it simply takes its own address (1.1.1} and adds .1 to it (i.e. 1.1.1.1). If the device wants to find the address of other device(s) connected to its second port (i.e., port 20), then it takes its own address (1.1.1) and adds a .2 to it (i.e. 1.1.1.2). This relation ship is illustrated in FIG. 2.

As can now be seen, the addressing method of the invention allows a device to immediately know its neighbor's address just by simply knowing it own address. This enables inter device communication without requiring allocation of memory to store address maps, as required by the prior art.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In a system of interconnected devices, an address assigning method, comprising, for each port available on a device of a first level having a first order address:

sending a signal to that port indicating that an address is to be assigned; and upon receiving a signal from a device of a second level connected to that port, assigning that second level device an address of a second order that is different from but sequentially related to any other second order address assigned to every other second level device that exists such that the assigned second order address indicates, at least indirectly, that the particular second device to which it is assigned is connected to a particular port on the device of the first level.

2. The method of claim 1, further comprising identifying the address of a given device within the system of interconnected devices by:

identifying an address of another device of any level within the system of interconnected devices, the address of the other device being of a second particular order corresponding to the other device's level;

identifying a level of the given device, the level of the given device indicating the given device has an address of a first particular order; and to identify the address of the given device:

if the first particular order differs from the second particular order, performing an operation on the address of the other device rendering it an address of the first particular order; or if the first particular order does not differ from the second particular order, performing an operation sequentially altering the address of the second device.

3. The method of claim 1, wherein assigning comprises assigning that second level device an address of a second order by adding a field to the address of the first level device, the added field corresponding to the port on the first level device to which that second level device is connected.

4. Computer readable media having instructions for, for each port available on a first level device having a first order address:

sending a signal to that port indicating that an address is to be assigned; and upon receiving a signal from a device of a second level connected to that port, assigning that second level device an address of a second order that is different from but sequentially related to any other second order address assigned to every other second level device that exists such that the assigned second order address indicates, at least indirectly, that the particular second device to which it is assigned is connected to a particular port on the device of the first level.

5. The media of claim 4, having further instructions for identifying the address of first device, the instructions for identifying including instructions for;

identifying an address of another device of any level within the system of interconnected devices, the address of the other device being of a second particular order corresponding to the other device's level;

identifying a level of the given device, the level of the given device indicating the given device has an address of a first particular order; and to identify the address of the given device:

if the first particular order differs from the second particular order, performing an operation on the address of the other device rendering it an address of the first particular order; or if the first particular order does not differ from the second particular order, performing an operation sequentially altering the address of the second device.

6. The media of claim 4, wherein the instructions for assigning include instructions for assigning that second level device an address of a second order by adding a field to the address of the first level device, the added field corresponding to the port on the first level device to which that second level device is connected.

7. In a system of interconnected devices, an address assigning method comprising:

identifying a first port available on a first device having an address of a first order;

sending a signal to the identified first port that an address is to be assigned;

upon receiving a signal from a second device indicating that the second device is connected to the identified first port, assigning the second device an address of a second order, the second order address assigned to the second device indicating, at least indirectly, that the second device is connected to the first port on the first device;

identifying a second port on the first device;

sending a signal to the second port that an address is to be assigned; and upon receiving a signal from a third device indicating that the third device is connected to the second port, assigning the third device an address of a second order that is different from but sequentially related to the address assigned to the second device, the second order address assigned to the third device indicating, at least indirectly, that the third device is connected to the second port on the first device.

8. The method of claim 7 wherein;

assigning the second device an address includes adding a field identifying the first port to the address for the first device; and assigning the third device an address includes adding a field identifying the second port to the address for the first device.

9. In a system of interconnected devices, an address assigning method comprising:

identifying a first port available on a first device having an address of a first order;

sending a signal to the identified first port that an address is to be assigned;

upon receiving a signal from a second device indicating that the second device is connected to the identified first port, assigning the second device an address of a second order, the assigned second order address indicating, at least indirectly, that the second device is connected to the first port on the first device; and identifying a first address assigned to a given device by:

identifying an address of another device of any level within the system of interconnected devices, the address of the other device being of a second particular order corresponding to the other device's level;

identifying a level of the given device, the level of the given device indicating the given device has an address of a first particular order; and to identify the address of the given device:

if the first particular order differs from the second particular order, performing an operation on the address of the other device rendering it an address of the first particular order; or if the first particular order does not differ from the second particular order, performing an operation sequentially altering the address of the second device.

10. Computer readable media, having instructions for:

identifying a first port available on a first device having an address of a first order;

sending a signal to the identified first port that an address is to be assigned;

upon receiving a signal from a second device indicating that the second device is connected to the identified first port, assigning the second device an address of a second order, the second order address assigned to the second device indicating, at least indirectly, that the second device is connected to the first port on the first device;

identifying a second port on the first device, sending a signal to the second port that an address is to be assigned; and upon receiving a signal from a third device indicating that the third device is connected to the second port, assigning the third device an address of a second order that is different from but sequentially related to the address assigned to the second device, the second order address assigned to the third device indicating, at least indirectly, that the third device is connected to the second port on the first device.

11. The media of claim 10, wherein the instructions for:

assigning the second device an address include Instructions for adding a field identifying the first port to the address for the first device; and assigning the third device an address include instructions for adding a field identifying the second port to the address for the first device.

12. Computer readable media, having instructions for:

identifying a first port available on a first device having an address of a first order;

sending a signal to the identified first port that an address is to be assigned; and upon receiving a signal from a second device indicating that the second device is connected to the identified first port, assigning the second device an address of a second order, the assigned second order address indicating, at least indirectly, that the second device is connected to the first port on the first device: and identifying the address of a given device, the instructions for identifying including instructions for:

identifying an address of another device of any level within the system of interconnected devices, the address of the other device being of a second particular order corresponding to the other device's level;

identifying a level of the given device, the level of the given device indicating the given device has an address of a first particular order; and to identify the address of the given device:

if the first particular order differs from the second particular order, performing an operation on the address of the other device rendering It an address of the first particular order; or if the first particular order does not differ from the second particular order, performing an operation sequentially altering the address of the second device.

* * * * *

UNITED STATES PATENT AND TRADEMARK OFFICE
CERTIFICATE OF CORRECTION

PATENT NO. : 6,772,232 B1
DATED : August 3, 2004
INVENTOR(S) : Newell, Jr. et al.

It is certified that error appears in the above-identified patent and that said Letters Patent is hereby corrected as shown below:

Column 2,
Line 50, delete "onto" and insert therefor -- into --
Line 52, after "12" delete the comma and insert a period
Line 52, delete "input" and insert therefor -- Input --

Column 3,
Lines 4, 14 and 25, after "address" delete the period

Column 4,
Line 10, delete "p" and insert therefor -- port --
Line 13, delete "relation ship" and insert therefor -- relationship --

Column 5,
Line 17, after "for" delete the semicolon and insert therefor a colon

Column 6,
Line 59, "Instructions" should not be capitalized

Column 8,
Line 7, delete "It" and insert therefor -- it --

Signed and Sealed this

Twenty-sixth Day of April, 2005

JON W. DUDAS
*Director of the United States Patent and Trademark Office*